United States Patent

Watanabe et al.

[11] Patent Number: 5,290,018
[45] Date of Patent: Mar. 1, 1994

[54] CYLINDRICAL DAMPING BUSHING

[75] Inventors: Satomi Watanabe; Katsuya Hadano, both of Inazawa, Japan

[73] Assignee: Toyoda Gosei Co., Ltd., Nishikasugai, Japan

[21] Appl. No.: 857,997

[22] Filed: Mar. 26, 1992

[30] Foreign Application Priority Data

Apr. 15, 1991 [JP] Japan .................. 3-109877

[51] Int. Cl.$^5$ ................................ F16F 1/36
[52] U.S. Cl. ........................ 267/293; 267/141.3
[58] Field of Search ........... 267/292, 293, 257, 258, 267/140, 141, 141.1, 141.2, 141.3, 141.4, 153, 196, 140.4, 294; 280/673

[56] References Cited

U.S. PATENT DOCUMENTS

| | | | |
|---|---|---|---|
| 1,913,936 | 6/1933 | Lee | 267/294 X |
| 2,557,610 | 6/1951 | Meyers et al. | 267/140.4 |
| 2,713,485 | 7/1955 | Tillou | 267/141.1 |
| 4,278,726 | 7/1981 | Wieme | 267/141.1 X |
| 4,951,930 | 8/1990 | Uno et al. | 267/141.2 X |

FOREIGN PATENT DOCUMENTS

| | | | |
|---|---|---|---|
| 0465188 | 5/1950 | Canada | 267/292 |
| 2417607 | 11/1974 | Fed. Rep. of Germany | 267/141.4 |
| 1162881 | 4/1958 | France | 267/141.3 |
| 0115637 | 9/1980 | Japan | 267/293 |
| 0191340 | 11/1983 | Japan | 267/292 |
| 0188832 | 8/1987 | Japan | 267/293 |
| 0057310 | 3/1988 | Japan | 267/293 |
| 63-130318 | 6/1988 | Japan | . |
| 0184512 | 7/1988 | Japan | 267/293 |
| 0225833 | 9/1990 | Japan | 267/153 |
| 2093563 | 9/1982 | United Kingdom | 267/140.4 |

*Primary Examiner*—Andres Kashnikow
*Assistant Examiner*—Peter M. Poon
*Attorney, Agent, or Firm*—Cushman, Darby & Cushman

[57] ABSTRACT

A cylindrical damping bushing for securing a rod-shaped vibrating body to a base. The bushing includes a cylindrical vibration-damping rubber body having an inner bore through which the vibrating body is inserted. An upper side surface thereof comes into contact with the base while the remaining outer side surface thereof is retained by a bracket which is secured to the base. First and second insert members, each having a rigidity greater than that of rubber, are respectively embedded in the axially central portion of the rubber body, except for both axial end portions thereof, in symmetric relation with each other with respect to the inner bore of the rubber body. The first insert member has a flat upper surface and an arc-shaped lower surface. The flat upper surface of the first insert member is flush with the upper side surface of the rubber body while the arc-shaped lower surface thereof is close to the inner bore within a predetermined interval. The second insert member has a sheet-like configuration of an arc-shaped cross section. The lower surface of the second insert member is flush with the lower side surface of the rubber body while the upper surface thereof is close to the inner bore within a predetermined interval.

8 Claims, 6 Drawing Sheets

PRIOR ART

CYLINDRICAL DAMPING BUSHING

BACKGROUND OF THE INVENTION

1. Field of the Invention

The present invention relates to a cylindrical damping bushing, and more particularly to a cylindrical damping bushing having a vibration-damping rubber body in which insert members are embedded in order to increase the rigidity thereof.

2. Description of the Related Art

A cylindrical damping bushing retains a rod-shaped vibrating body such as a stabilizer bar of vehicle by inserting it through a cylindrical vibration-damping rubber body. In FIG. 1, the cylindrical damping bushing 19 retains a bent portion of a stabilizer bar 21 which extends from a suspension arm 20, and secures it to a vehicle frame in order to prevent the stabilizer bar 2 from coming loose in the transverse direction thereof.

FIG. 2 illustrates one example of conventional damping bushings. In the drawing, a vibration-damping rubber body 30 has a cross section composed of a rectangular upper half and a semicircular lower half. A slit 31 is formed in the rubber body 30 from its inner periphery to its outer periphery. By enlarging the slit 31, the stabilizer bar is inserted into an inner bore of the rubber body 30.

Reference numeral 32 designates a flange portion which is formed at each axial end of the rubber body 30.

With the conventional damping bushing having the above-described construction, the rigidity thereof is insufficient particularly in the vertical direction, to stably retain the stabilizer bar.

In another example of convention damping bushings, the rigidity thereof has been increased by embedding metallic insert members in the vibration-damping rubber body, as shown in FIGS. 3 and 4. In the drawings, the metallic insert members 42, 43, each having an arc-shaped cross section, are embedded in a vibration-damping rubber body 40 at vertically symmetric positions with respect to an inner bore 41.

Recently, in order to reduce twisting torque of the stabilizer bar and prevent the generation of noise, a liner 44 made of Teflon fibers having good slidability has been joined to an inner periphery of the vibration-damping rubber body.

When the above-described rubber body provided with the liner is formed by injection molding, both longitudinal ends of each of the insert members 42, 43 must be projected from axial ends of the rubber body 40, as shown in FIG. 4 in order to retain them at predetermined positions within a mold. However, this method complicates the construction of the mold. In addition, the projected ends of the insert members 42, 43 may strike against the stabilizer bar which is inserted into the rubber body 40. Mud, pebbles or the like may be caught between the projected ends of the insert members 42, 43 and the stabilizer bar, or the projected ends of the insert members 42, 43, if made of metal, are likely to rust.

SUMMARY OF THE INVENTION

It is an object of the present invention to provide a cylindrical damping bushing including insert members, which can be formed with a simply-structured mold, and can be prevented from rusting and striking against the stabilizer bar.

The cylindrical damping bushing has a cylindrical vibration-damping rubber body having an inner bore through which a rod-shaped vibrating body is inserted. One portion of the outer periphery of the rubber body comes into close contact with a base, whereas the remaining portion thereof comes into close contact with a bracket which is secured to the base. A first insert member having a rigidity greater than that of rubber is embedded in the axially central portion of the rubber body, except for both axial end portions thereof, at the position extending from the one portion of the outer periphery of the rubber body to the vicinity of the inner bore thereof. A second insert member having a rigidity larger than that of rubber is embedded in the axially central portion of the rubber body, except for both axial end portions thereof, at the position extending from the remaining portion of the outer periphery of the rubber body to the vicinity of the inner bore thereof in symmetric relation with the first insert member with respect to the inner bore of the rubber body.

With the damping bushing having the above-described construction, the rigidity thereof is increased in the directions of the insert members, whereby the stabilizer bar can be stably retained by the damping bushing. Furthermore, the insert members can be easily retained while the vibration-damping rubber body is formed by injection molding because they are embedded in the vibration-damping rubber body, except for both axial end portions thereof, at the position extending from the outer periphery of the rubber body to the vicinity of the inner bore thereof. Accordingly, the structure of the mold can be simplified.

Moreover, with the damping bushing of the present invention, the insert members are not exposed to the outside of the vibration-damping rubber body. Therefore, the insert members are prevented from rusting or catching mud or the like.

Other objects, features and characteristics of the present invention will become apparent upon consideration of the following description and the appended claims with reference to the accompanying drawings, all of which form a part of this specification.

DETAILED DESCRIPTION OF THE INVENTION

Figure 1:
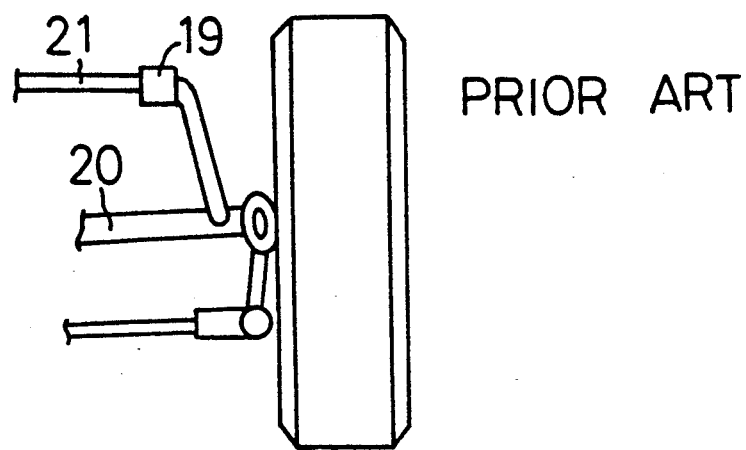
FIG. 1 is a schematic front view of a conventional suspension provided with a damping bushing.
Figure 2:
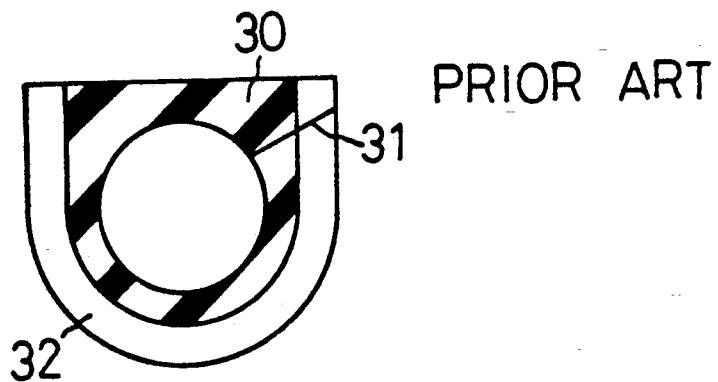
FIG. 2 is a cross-sectional view of one conventional damping bushing.
Figure 3:
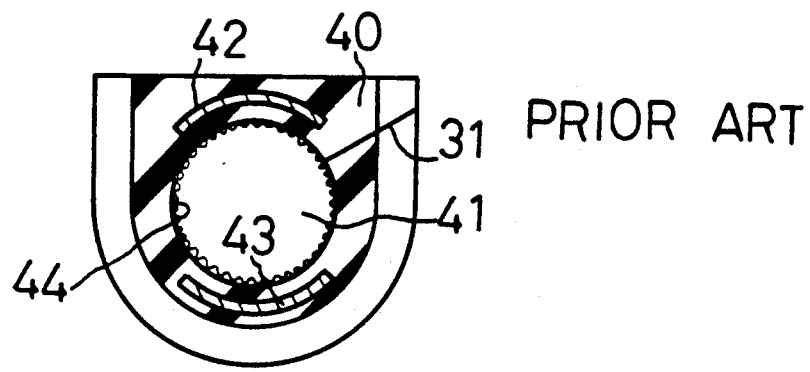
FIG. 3 is a cross-sectional view of another conventional damping bushing.
Figure 4:
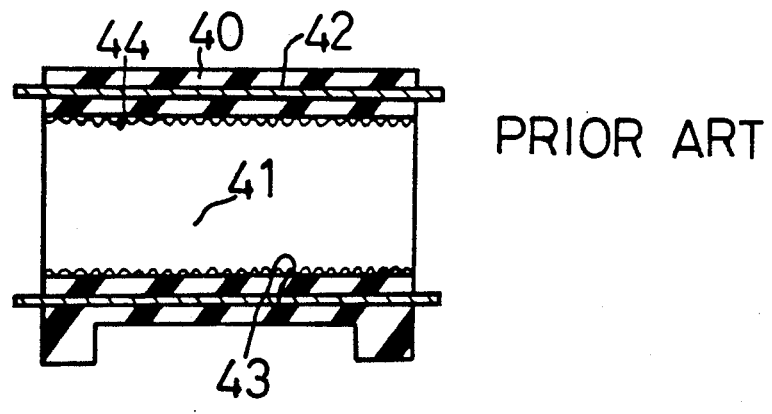
FIG. 4 is a longitudinal sectional view of the conventional damping bushing of FIG. 3.
Figure 5:
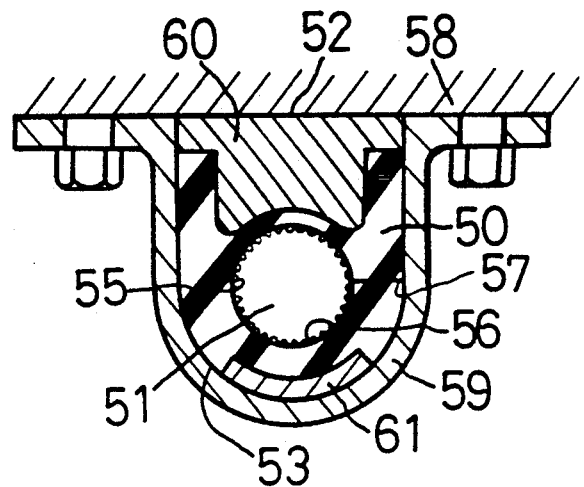
FIG. 5 is a cross-sectional view of a first embodiment of a damping bushing in accordance with the present invention.
Figure 8:
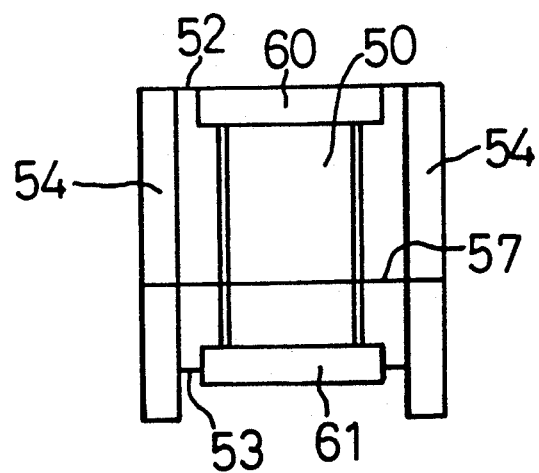
FIG. 8 is a side view of the first embodiment.

FIGS. 5 and 8 illustrate a first embodiment of the present invention. A vibration-damping rubber body 50 is composed of a cylindrical block having an inner bore 51 penetrating the axial center thereof, and has a cross-section composed of a rectangular upper half and a semicircular lower half.

An upper side surface 52 of the rubber body 50 is flat, whereas a lower side surface 53 curves in an arc. Both axial end portions of the rubber body 50 except for the upper side surface 52 thereof, project radially outwardly, thereby forming flange portions 54.

A liner 56 is joined to an inner peripheral surface 55 of the rubber body 50. The liner 56 is composed of an inner layer of Teflon fibers having good slidability, and an outer layer of polyester fibers for reinforcement. The liner 56 is obtained by weaving these fibers into a cylindrical configuration.

A slit 57 is formed in the rubber body 50 from its inner peripheral surface 55 to it outer peripheral surface.

A stabilizer bar 21 (FIG. 6) is inserted into the inner bore 51 of the rubber body 50 by enlarging the slit 57. Then, as shown in FIG. 5, the rubber body 50 is secured to a vehicle frame 58 at the base by a U-shaped bracket 59 with the upper side surface 52 in contact with the vehicle frame 58, and the remaining side surface, except for the flange portions 54, in contact with the bracket 59.

An insert member 60 which is composed of a metal or resin block is embedded in the upper half of the rubber body 50 except for the flange portions 54. An upper surface of the insert member 60 is flat and flush with the upper side surface 52 of the rubber body 50, whereas the lower surface thereof curves in an arc and is close to the inner peripheral surface 55 within a predetermined interval.

An insert member 51 is embedded in the lower half of the rubber body 50 in symmetric relation with the insert member 60. The insert member 61 is composed of a metal or resin sheet of a uniform thickness, and has an arc-shaped cross-section. The lower surface of the insert member 61 curves so as to be flush with the lower side surface 53 of the rubber body 50, whereas the upper surface thereof is close to the inner peripheral surface 55 of the rubber body 50 within a predetermined interval.

Figure 6:
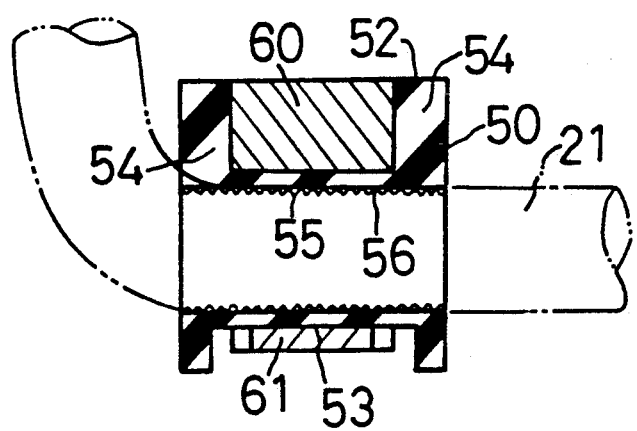
FIG. 6. is a longitudinal sectional view of the first embodiment.
Figure 7:
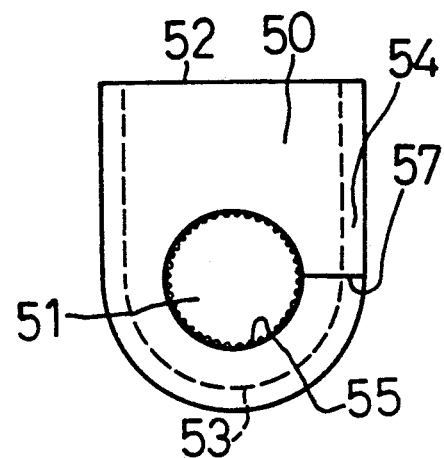
FIG. 7 is a front view of the first embodiment.

FIG. 6 illustrates the state where the stabilizer bar 21 is inserted into the inner bore 51 of the rubber body 50. With the damping bushing having the above construction, the rigidity thereof is sufficiently increased in the directions of the insert members 60, 61, thereby enabling the stable retention of the stabilizer bar 21. Moreover, the twisting deformation or the like of the stabilizer bar 21 is ensured by virtue of the liner 56.

The insert members 60, 61 are located so that one surface of each insert member is substantially flush with the upper side surface 52 or the lower side surface 53 of the vibrationdamping rubber body 50. Therefore, the insert members 60, 61 can be easily retained when the rubber body 50 is formed by injection molding. As a result, the construction of the mold can be simplified.

The insert members 60, 61 are not exposed to the outside of the rubber body 50. Therefore, they are prevented from rusting, and mud or the like is prevented from being caught by the damping bushing. Moreover, the insert member 60, 61 are prevented from directly striking against the bent portion of the stabilizer bar 21.

When the rubber body 50 is formed, the upper surface of the insert member 60 and the lower surface of the insert member 61 are respectively exposed to the outside of the rubber body 50. However, the insert members 60, 61 are prevented from rusting because when the damping bushing is secured to the vehicle by the bracket 59, the upper surface of the insert member 60 comes into close contact with the vehicle frame 58 and the lower surface of the insert member 61 comes into close contact with the inner surface of the bracket 59 so that the insert members 60, 61 are isolated from the external atmosphere.

In order to secure the damping bushing to the vehicle frame 58, the bracket 59 is first mounted on the outer periphery of the vibration-damping rubber body 50 through which the stabilizer bar 21 is inserted, and then the bracket 59 is secured to the vehicle frame 58 by holding the stabilizer bar 21 in hand. However, there are cases where the bracket 59 comes off the outer periphery of the rubber body 50 before being secured to the vehicle frame 58.

Figure 9:
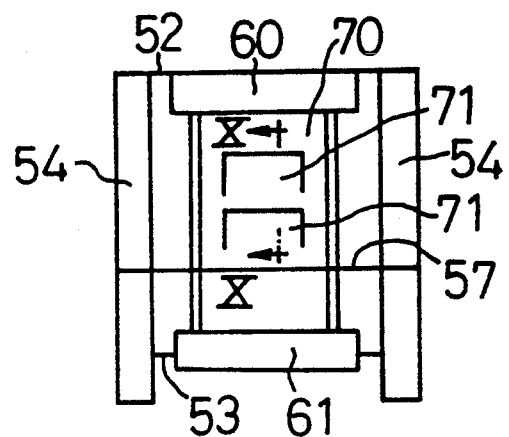
FIG. 9 is a side view of a second embodiment of the damping bushing in accordance with the present invention.
Figure 10:
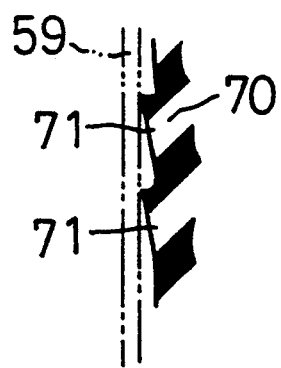
FIG. 10 is an enlarged cross-section of one portion of the second embodiment, which is taken along the line X—X of FIG. 9.

FIGS. 9 and 10 illustrate a second embodiment of the damping bushing of the present invention, which is provided with means for preventing the bracket from coming off the vibration-damping rubber body.

In FIG. 9, two projections 71 are formed in the central portion of each vertical slide surface of a vibration-damping rubber body 70 in vertically spaced relation with each other. Each of the projections 71 has a saw-toothed cross-section which projects obliquely upward. These projections 71 resiliently contact with the inner surface of the bracket 59, thereby preventing the bracket 59 from coming off the rubber body 70.

The remainder of the construction of the cylindrical damping bushing of the second embodiment is substantially identical to that of the first embodiment.

Figure 11:
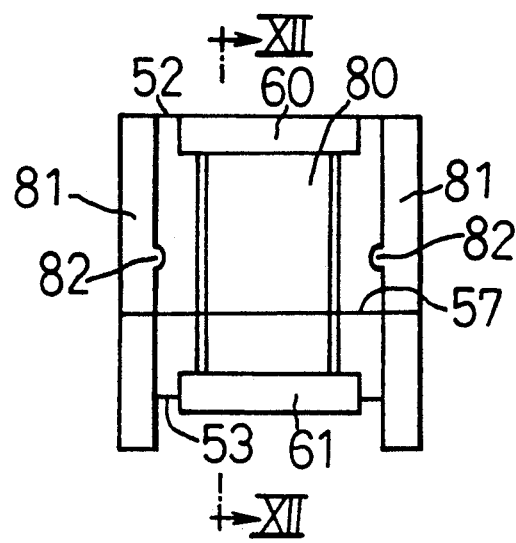
FIG. 11 is a side view of a third embodiment of the damping bushing in accordance with the present invention.
Figure 12:
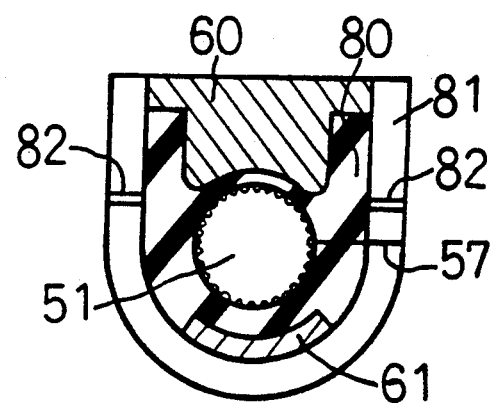
FIG. 12 is a cross-sectional view of the third embodiment taken along the line XII—XII of FIG. 11.

FIGS. 11 and 12 illustrate a third embodiment of the damping bushing of the present invention, which is provided with another means for preventing the bracket from coming off the vibration-damping rubber body.

In the drawings, projections 82, each having a semicircular cross-section, are formed in the vertically central portion of the inner side surfaces of the flange portions 81 of the vibration-damping rubber body 80. When the bracket (not shown) is mounted on the outer periphery of the rubber body 80, the projections 82 resiliently contact with side edges of the bracket, thereby preventing the bracket from coming off the rubber body 80.

The remainder of the construction of the cylindrical damping bushing of the third embodiment is substantially identical to that of the first embodiment.

The projections 71 of the second embodiment, and the projections 82 of the third embodiment may be provided together. In this case, one portion of each projection 82, which is adjacent to the outer peripheral surface of the vibration-damping rubber body, may be cut off by the amount identical to the thickness of the bracket. This modification enables the projections 82 to receive both end portions of the bracket which is about to come off the rubber body.

As described above, the cylindrical damping bushing of the present invention can be easily formed with a simply-structured mold, and is free from any strike against the vibrating body which is retained by the damping bushing, catch of mud or the like, or generation of rust.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A cylindrical damping body for securing a rod-shaped vibrating bushing to a base, comprising:
   a cylindrical vibration-damping rubber body having an inner bore through which the rod-shaped vibrating body is inserted, one portion of an outer periphery of said rubber body coming into contact with the base, a remaining portion of said outer periphery of said rubber body coming into contact with a bracket which is secured to the base;
   a first insert member having a rigidity greater than that of rubber, said first insert member being embedded in an axially central portion of said rubber body, except for both axial end portions of said rubber body, said first insert member having a surface which is flush with said one portion of said outer periphery of said rubber body, and an arc-shaped surface which is close to said inner bore of said vibration damping rubber body within a predetermined interval; and
   a second insert member having a rigidity greater than that of rubber, said second insert member being embedded in said axially central portion of said rubber body, except for both axial end portions of said rubber body in symmetric relations with said first insert member, said second insert member having a surface which is flush with said remaining portion of said outer periphery of said rubber body, and an arc-shaped surface which is close to said inner bore of said vibration-damping rubber body within a predetermined interval.

2. The cylindrical damping bushing according to claim 1, wherein a liner made of by weaving fibers having good slidability into a cylindrical configuration is joined to an inner periphery of said inner bore.

3. The cylindrical damping bushing according to claim 1, wherein said vibrationdamping rubber body has a cross-section composed of a rectangular upper half and a semicircular lower half, said both axial end portions of said rubber body, except for an upper side surface thereof projects radially outward, thereby forming flange portions, an outer peripheral surface of said vibration-damping rubber body, except for said upper side surface and said flange portions, being retained by said bracket having a U-shaped configuration, and being secured to the base with said upper side surface in close contact with said base, said first insert member having a flat upper surface which is flush with said upper side surface of said rubber body, and arc-shaped lower surface which is close to said inner bore of said vibration damping rubber body within a predetermined interval, said second insert member being composed of a sheet member which has an arcshaped cross-section, and having a lower surface which is flush with said lower side surface of said vibration-damping rubber body and an upper surface which is close to said inner bore of said vibration-damping rubber body within a predetermined interval.

4. The cylindrical damping bushing according to claim 3, wherein projections are formed on vertical portions of said outer periphery of said vibration-damping rubber body, said projections resiliently contacting an inner periphery of said bracket, thereby preventing said bracket from coming off said rubber body.

5. The cylindrical damping bushing according to claim 3, wherein projections are formed on an inner side surface of each of said flange portions, said projections resiliently contacting side edges of said bracket, thereby preventing said bracket from coming off said rubber body.

6. A cylindrical damping bushing for securing a rod-shaped vibrating body to a base, comprising:
   A cylindrical vibration-damping rubber body having an inner bore through which the rod-shaped vibrating body is inserted, one portion of an outer periphery of said rubber body coming into contact with the base, the remaining portion of said outer periphery of said rubber body coming into contact with a bracket which is secured to the base;
   a first insert member having a rigidity greater than that of rubber, said first insert member being embedded in an axially central portion of said rubber body, except for both axial end portions of said rubber body, at the position extending from said one portion of said outer periphery of said rubber body to the vicinity of said inner bore; and
   a second insert member having a rigidity greater than that of rubber, said second insert member being embedded in said axially central portion of said rubber body, except for both axial end portions of said rubber body at the position extending from said remaining portion of said outer periphery of said rubber body to the vicinity of said inner bore thereof in symmetric relation with said first insert member with respect to said inner bore of said rubber body,
   said vibration-damping rubber body having a cross-section composed of a rectangular upper half and a semicircular lower half, said both axial end portions of said rubber body, except for an upper side surface thereof projecting radially outward, thereby forming flange portions, an outer peripheral surface of said vibration-damping rubber body, except for said upper side surface and said flange portions, being retained by said bracket having a U-shaped configuration, and being secured to the base with said upper side surface in close contact with said base, said first insert member having a flat upper surface which is flush with said upper side surface of said rubber body, and arc-shaped lower surface which is close to said inner bore of said vibration damping rubber body within a predetermined interval, said second insert member being composed of a sheet member which has an arc-shaped cross-section, and having a lower surface which is flush with said lower side surface of said vibration-damping rubber body and an upper surface which is close to said inner bore of said vibration-damping rubber body within a predetermined level.

7. The cylindrical damping bushing according to claim 6, wherein projections are formed on vertical portions of said outer periphery of said vibration-damping rubber body, said projections resiliently contacting an inner periphery of said bracket, thereby preventing said bracket from coming off said rubber body.

8. The cylindrical damping bushing according to claim 6, wherein projections are formed on an inner side surface of each of said flange portions, said projections resiliently contacting side edges of said bracket, thereby preventing said bracket from coming off said rubber body.

* * * * *